(12) United States Patent
Yang

(10) Patent No.: US 9,961,641 B2
(45) Date of Patent: May 1, 2018

(54) METHOD FOR USER EQUIPMENT POWER SAVING, APPARATUS, AND USER EQUIPMENT

(71) Applicant: HUAWEI TECHNOLOGIES CO., LTD., Shenzhen (CN)

(72) Inventor: Xiaodong Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 14/737,831

(22) Filed: Jun. 12, 2015

(65) Prior Publication Data

US 2015/0282087 A1 Oct. 1, 2015

Related U.S. Application Data

(63) Continuation of application No. PCT/CN2012/086509, filed on Dec. 13, 2012.

(51) Int. Cl.
*H04W 52/02* (2009.01)

(52) U.S. Cl.
CPC ... *H04W 52/0235* (2013.01); *H04W 52/0261* (2013.01); *H04W 52/0277* (2013.01); *Y02B 60/50* (2013.01)

(58) Field of Classification Search
CPC ......... H04W 52/0235; H04W 52/0261; H04W 52/0277; Y02B 60/50
USPC ........................................................ 370/311
See application file for complete search history.

(56) References Cited

U.S. PATENT DOCUMENTS

| | | | | |
|---|---|---|---|---|
| 2010/0002665 A1* | 1/2010 | Oguchi | ............. | H04W 52/0216 370/338 |
| 2010/0056126 A1* | 3/2010 | Tachikawa | .......... | H04W 76/048 455/418 |
| 2010/0062725 A1* | 3/2010 | Ryu | .................. | H04W 52/0251 455/69 |
| 2012/0213177 A1 | 8/2012 | Lee et al. | | |

(Continued)

FOREIGN PATENT DOCUMENTS

| CN | 101883370 A | 11/2010 |
|---|---|---|
| CN | 102487541 | 6/2012 |

(Continued)

OTHER PUBLICATIONS

International Search Report dated Sep. 26, 2013 in corresponding international application PCT/CN2012/086509.

(Continued)

*Primary Examiner* — Stephen J Clawson
(74) *Attorney, Agent, or Firm* — Staas & Halsey LLP

(57) ABSTRACT

Embodiments of the present invention relate to a user equipment power saving method, an apparatus, and user equipment. The method includes: determining whether power saving needs to be performed on user equipment; if power saving needs to be performed on the user equipment, sending a power saving configuration request to a network side, where the power saving configuration request is used to request the network side to perform, according to the power saving configuration request, a power saving configuration on the user equipment. According to the user equipment power saving method provided in embodiments of the present invention, an objective of reducing power consumption of UE can be achieved, thereby improving user experience.

16 Claims, 5 Drawing Sheets

(56) References Cited

U.S. PATENT DOCUMENTS

| | | | | |
|---|---|---|---|---|
| 2013/0265922 A1* | 10/2013 | Chakravarthy | ... | H04W 52/0212 370/311 |
| 2013/0301500 A1* | 11/2013 | Koc | .................... | H04W 76/048 370/311 |
| 2014/0119255 A1* | 5/2014 | Vannithamby | ......... | H04B 15/00 370/311 |

FOREIGN PATENT DOCUMENTS

| | | |
|---|---|---|
| CN | 102573022 | 7/2012 |
| CN | 102625421 | 8/2012 |

OTHER PUBLICATIONS

PCT International Search Report dated Sep. 26, 2013 in corresponding International Patent Application No. PCT/CN2012/086509.

\* cited by examiner

METHOD FOR USER EQUIPMENT POWER SAVING, APPARATUS, AND USER EQUIPMENT

CROSS-REFERENCE TO RELATED APPLICATIONS

This application is a continuation of International Application No. PCT/CN2012/086509, filed on Dec. 13, 2012, which is hereby incorporated by reference in its entirety

TECHNICAL FIELD

Embodiments of the present invention relate to the communications field, and in particular, to a user equipment power saving method, an apparatus, and a user equipment.

BACKGROUND

Power consumption of user equipment (UE) in a radio resource control connected (RRC connected) state depends on, to a great extent, scheduling performed by a network on the UE. A guaranteed bit rate (GBR) requirement of the UE is mainly considered when the network performs scheduling on the UE in the RRC connected state, and GBR requirements of multiple UEs are first ensured. When there are remaining system resources, scheduling is then performed fairly according to different bearer priorities of different UEs. However, a network side does not consider power saving requirements of the UEs.

For UE in a radio resource control idle (RRC idle) state, power consumption of the UE mainly lies in paging (paging) listening performed by the UE, frequency of cell reselection performed by the UE, frequency of TA update performed by the UE, and so on. When configuring the UE, the network side considers a condition of the entire network, but does not consider a power saving requirement of the UE. Particularly, in a case in which the UE is expected to prolong standby time, how to reduce power consumption of the UE is not considered either.

SUMMARY

An objective of embodiments of the present invention is to provide a user equipment power saving method, so that power consumption of user equipment can be reduced.

According to a first aspect, an embodiment of the present invention provides a user equipment power saving method, where the method includes:

determining whether power saving needs to be performed on user equipment; and when power saving needs to be performed on the user equipment, sending a power saving configuration request to a network side, where the power saving configuration request is used to request the network side to perform, according to the power saving configuration request, a power saving configuration on the user equipment.

With reference to the first aspect, in a first possible implementation manner, after the sending a power saving configuration request to a network side, the method further includes: receiving a power saving configuration notification message responded by the network side to the user equipment, where the power saving configuration notification message is used to notify the user equipment of the power saving configuration performed by the network side on the user equipment.

With reference to the first aspect, in a second possible implementation manner, the sending a power saving configuration request to a network side includes:

requesting the network side to perform the power saving configuration on the user equipment in an RRC idle state or an RRC connected state.

With reference to the first aspect, in a third possible implementation manner, the sending a power saving configuration request to a network side specifically includes:

requesting the network side to change a paging cycle of the user equipment; or requesting the network side to add a tracking area configured for the user equipment; or requesting the network side to improve a frequency priority that is of a cell with a large coverage area and that is configured for the user equipment; or requesting the network side to increase a discontinuous reception period of the user equipment; or requesting the network side to increase power used for sending data to the user equipment; or requesting the network side to increase a size of a data block sent to the user equipment; or requesting the network side to enable a disabled cell for the user equipment.

With reference to the first aspect, in a fourth possible implementation manner, before the sending a power saving configuration request to a network side, the method further includes:

receiving a power saving control application instruction, where the power saving control application instruction is used to generate the power saving configuration request.

With reference to the first aspect, in a fifth possible implementation manner, before the determining whether power saving needs to be performed on user equipment, the method further includes:

receiving a power saving configuration query message sent by the network side, where the power saving configuration query message is used to query whether power saving needs to be performed on the user equipment.

According to a second aspect, an embodiment of the present invention provides a power saving configuration method for user equipment, where the method includes:

receiving a power saving configuration request sent by user equipment, where the power saving configuration request is used to request a network side to perform, according to the power saving configuration request, a power saving configuration on the user equipment; and performing the power saving configuration on the user equipment according to the power saving configuration request.

With reference to the second aspect, in a first possible implementation manner, before the receiving a power saving configuration request sent by user equipment, the method further includes:

sending a power saving configuration query message to the user equipment, where the power saving configuration query message is used to query whether power saving needs to be performed on the user equipment; and if the power saving configuration request is received, determining that power saving needs to be performed on the user equipment.

With reference to the second aspect, in a second possible implementation manner, after the performing the power saving configuration on the user equipment according to the power saving configuration request, the method further includes:

sending a power saving configuration notification message to the user equipment, where the power saving configuration notification message is used to notify the user equipment of the power saving configuration performed by the network side on the user equipment.

With reference to the second aspect, in a third possible implementation manner, the performing the power saving configuration on the user equipment according to the power saving configuration request specifically includes one or more of the following manners:

changing a paging cycle of the user equipment; or adding a tracking area configured for the user equipment; or improving a frequency priority that is of a cell with a large coverage area and that is configured for the user equipment; where the user equipment is in a radio resource control idle RRC idle state.

With reference to the second aspect, in a fourth possible implementation manner, the performing the power saving configuration on the user equipment according to the power saving configuration request specifically includes one or more of the following manners:

increasing a discontinuous reception period of the user equipment; or increasing power used for sending data to the user equipment; or increasing a size of a data block sent to the user equipment; or enabling a disabled cell for the user equipment; where the user equipment is in a radio resource control connected RRC connected state.

According to a third aspect, an embodiment of the present invention provides user equipment, including:

a determining unit, configured to determine whether power saving needs to be performed on the user equipment; and a sending unit, configured to: when power saving needs to be performed on the user equipment, send a power saving configuration request to a network side, where the power saving configuration request is used to request the network side to perform, according to the power saving configuration request, a power saving configuration on the user equipment.

With reference to the third aspect, in a first possible implementation manner, the user equipment further includes: a receiving unit, configured to receive a power saving configuration notification message responded by the network side to the user equipment, where the power saving configuration notification message is used to notify the user equipment of the power saving configuration performed by the network side on the user equipment.

With reference to the third aspect, in a second possible implementation manner, the sending unit is specifically configured to:

request the network side to change a paging cycle of the user equipment; or request the network side to add a tracking area configured for the user equipment; or request the network side to improve a frequency priority that is of a cell with a large coverage area and that is configured for the user equipment; or request the network side to increase a discontinuous reception period of the user equipment; or request the network side to increase power used for sending data to the user equipment; or request the network side to increase a size of a data block sent to the user equipment; or request the network side to enable a disabled cell for the user equipment.

According to a fourth aspect, an embodiment of the present invention provides a power saving configuration apparatus, where the apparatus includes:

a receiving unit, configured to receive a power saving configuration request sent by user equipment, and send the received power saving configuration request to a configuring unit, where the power saving configuration request is used to request the power saving configuration apparatus to perform, according to the power saving configuration request, a power saving configuration on the user equipment; and the configuring unit, configured to receive the power saving configuration request sent by the receiving unit, and perform the power saving configuration on the user equipment according to the power saving configuration request.

With reference to the fourth aspect, in a first possible implementation manner, the apparatus further includes:

a sending unit, configured to send a power saving configuration notification message to the user equipment, where the power saving configuration notification message is used to notify the user equipment of the power saving configuration performed by the power saving configuration apparatus on the user equipment.

With reference to the fourth aspect, in a second possible implementation manner, the apparatus further includes: a querying unit, configured to send a power saving configuration query message to the user equipment, where the power saving configuration query message is used to query whether power saving needs to be performed on the user equipment; and the configuring unit is specifically configured to perform the power saving configuration on the user equipment when the receiving unit receives the power saving configuration request sent by the user equipment.

With reference to the fourth aspect, in a third possible implementation manner, the configuring unit is specifically configured to perform the power saving configuration on the user equipment in one or more of the following manners:

changing a paging cycle of the user equipment; or adding a tracking area configured for the user equipment; or improving a frequency priority that is of a cell with a large coverage area and that is configured for the user equipment; where the user equipment is in a radio resource control idle RRC idle state.

With reference to the fourth aspect, in a fourth possible implementation manner, the configuring unit is specifically configured to perform the power saving configuration in one or more of the following manners:

increasing a discontinuous reception period of the user equipment; or increasing power used for sending data to the user equipment; or increasing a size of a data block sent to the user equipment; or enabling a disabled cell for the user equipment; where the user equipment is in a radio resource control connected RRC connected state.

According to a fifth aspect, an embodiment of the present invention provides user equipment, where the user equipment includes: a transmitter, a receiver, a memory, and a processor separately connected to the transmitter, the receiver and the memory, where the memory stores a set of program code, and the processor is configured to invoke the program code stored in the memory, so as to execute the following operations:

determining whether power saving needs to be performed on the user equipment; and when power saving needs to be performed on the user equipment, sending a power saving configuration request to a network side by using the transmitter, where the power saving configuration request is used to request the network side to perform, according to the power saving configuration request, a power saving configuration on the user equipment.

According to a sixth aspect, an embodiment of the present invention provides a power saving configuration apparatus, where the apparatus includes: a transmitter, a receiver, a memory, and a processor separately connected to the transmitter, the receiver and the memory, where the memory stores a set of program code, and the processor is configured to invoke the program code stored in the memory, so as to execute the following operations:

receiving a power saving configuration request sent by user equipment, where the power saving configuration request is used to request the network side to perform, according to the power saving configuration request, a power saving configuration on the user equipment; and performing the power saving configuration on the user equipment according to the power saving configuration request.

By applying the technical solutions provided in the embodiments of the present invention, user equipment UE on which power saving configuration needs to be performed sends a power saving request to a network side, the network side performs power saving configuration or scheduling on the UE according to the request sent by the user equipment UE, so as to reduce power consumption of the UE and achieve an objective of saving power of the user equipment, thereby improving experience on the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The technical solutions of the present invention are further described in detail with reference to accompanying drawings and embodiments as follows:

A core idea of the embodiments of the present invention lies in that, when power saving needs to be performed on UE, a power saving request is sent to a network side, and a base station in an access network on the network side or a mobility management entity (MME) in a core network on the network side performs power saving configuration or scheduling on the user equipment, so as to achieve an objective of saving power of the user equipment.

Figure 1:
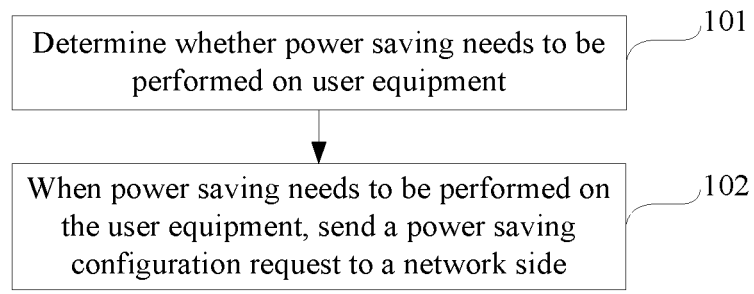
FIG. 1 is a schematic flowchart of an embodiment of a user equipment power saving method according to an embodiment of the present invention.

One aspect of an embodiment of the present invention provides a user equipment power saving method. FIG. 1 is a schematic flowchart of the user equipment power saving method provided in this embodiment. An entity for executing the method may be user equipment, and the method includes the following content:

Step 101: Determine whether power saving needs to be performed on the user equipment.

Specifically, the user equipment may determine, according to a current service requirement or a current power quantity, whether power saving needs to be performed. For example, the current power quantity of the user equipment is less than 10% or a current service is a video service, and if the user equipment needs longer standby time or is in a case in which the user equipment cannot be charged in time, power saving needs to be performed to avoid deterioration in experience caused by a waste of power of the user equipment due to an unnecessary operation. Optionally, the user equipment may use the current service requirement or power quantity as a triggering condition for determining whether power saving needs to be performed on the user equipment. For example, if the current service requirement is a video service or a battery level is less than 10%, that power saving may be performed on the user equipment is determined by means of automatic triggering, without requiring a network side to detect whether power saving needs to be performed on the user equipment.

Step 102: When power saving needs to be performed on the user equipment, send a power saving configuration request to a network side, where the power saving configuration request is used to request the network side to perform, according to the power saving configuration request, a power saving configuration on the user equipment.

Specifically, the network side in this embodiment of the present invention may be a base station, or may be a mobility management entity. The user equipment may send the power saving configuration request to the base station over an air interface, or may forward the power saving configuration request to the mobility management entity by using the base station.

If determining that power saving needs to be performed, the user equipment may send the power saving configuration request to the network side. If accepting the power saving configuration request, the network side may perform a power saving configuration on the user equipment according to the power saving configuration request. If not accepting the power saving configuration request, the network side may not perform a power saving operation on the user equipment; for example, if the user equipment is not a paying customer authenticated by a network, the network side may refuse a power saving operation request sent by the user equipment, and does not perform a power saving configuration on the user equipment.

Still further, the user equipment may receive an instruction, where the instruction is used to indicate that power saving needs to be performed on the user equipment. After receiving the instruction, the user equipment determines that power saving needs to be performed, and the user equipment sends the power saving configuration request to the network side. Optionally, the instruction may be an instruction delivered by the network side; for example, the user equipment is selected by the network side as a terminal for performing minimization of drive test (MDT), the user equipment should reserve an enough power quantity to complete MDT measurement, and the network side instructs the user equipment to perform power saving. Optionally, the instruction may also be a power saving configuration request that is generated by running a power saving control application program and that is sent to the network side, where the program is installed on the user equipment and is run by a user of the user equipment.

In an implementation manner of the user equipment power saving method provided in this embodiment of the present invention, the user equipment may only send the power saving configuration request, and what power saving configuration to be specifically performed is determined and executed by the network side; an objective of saving power of the user equipment may also be achieved even if the user equipment is not notified of the power saving configuration.

Optionally, the foregoing method may further include:

Step 103: Receive a configuration notification message responded by the network side to the user equipment.

Specifically, after receiving the power saving configuration request sent by the user equipment, the network side modifies a configuration of the user equipment, and adjusts priorities of network functions, for example, voice or data transmission. The network side sends a modified configuration to the user equipment, and the user equipment receives the power saving configuration notification message responded by the network side to the user equipment, where the power saving configuration notification message carries a power saving configuration performed by the network side on the user equipment.

According to this embodiment of the present invention, user equipment can actively send a power saving configuration request to a network side, and the network side modifies a configuration of the user equipment on a network according to the request sent by the user equipment, so as to achieve an objective of reducing power consumption of the user equipment, thereby improving experience on the user equipment.

In this embodiment of the present invention, the user equipment may request the network side to perform a power saving configuration on the user equipment in an RRC idle state, or request the network side to perform a power saving configuration on the user equipment in an RRC connected state.

Still further, in another implementation manner of the user equipment power saving method provided in this embodiment of the present invention, the user equipment may further add a requested power saving configuration to the power saving configuration request sent to the network side, where the network side is requested to specifically perform the requested power saving configuration. The network side may accept the power saving configuration requested in the power saving configuration request, so as to achieve a power saving configuration that is expected by the power saving configuration request sent by the user equipment; or the network side may accept that the power saving configuration is to be performed on the user equipment, but refuse the power saving configuration requested by the user equipment and perform another power saving configuration instead.

The user equipment in the RRC idle state may add the foregoing one or more requested power saving configurations to the power saving configuration request. The network side may accept all or a part of the one or more power saving configurations in the power saving configuration request, and performs a power saving configuration on the user equipment.

In a possible implementation manner, the user equipment may send, to the network side, a request for changing a paging cycle of the user equipment. If the network side accepts the request sent by the user equipment and changes the paging cycle of the user equipment, times of paging listening performed when the user equipment in the RRC idle state wakes up at a fixed time can be reduced, so as to achieve an objective of saving power.

In another possible implementation manner, the user equipment directly sends, to the network side, a request for adding a tracking area configured for the user equipment. If the network side accepts the request sent by the user equipment and adds, for the user equipment, the tracking area configured for the user equipment, a process of tracking area updating that needs to be performed by the user equipment, in the RRC idle state, during inter-tracking area movement can be simplified, so as to achieve an objective of saving power.

In another possible implementation manner, the user equipment sends, to the network side, a request for improving a frequency priority that is of a cell with a large coverage area and that is configured for the user equipment. If the network side accepts the request sent by the user equipment, coverage areas, in which the user equipment can move, of multiple cells may be determined according to a sending frequency band of the network side. For a cell with a relatively large coverage area, a frequency priority of the cell is improved; correspondingly, for a cell with a relatively small coverage area, a frequency priority of the cell may be reduced. In this way, a frequency priority that is of a cell with a relatively large coverage area and that is configured for the user equipment is relatively high, which can reduce times of reselection performed by the user equipment, in the RRC idle state, during inter-cell movement, so as to achieve an objective of saving power.

The user equipment in the RRC connected state may add the foregoing one or more requested power saving configurations to the power saving configuration request. The network side may accept all or a part of the one or more power saving configurations in the power saving configuration request, and performs a power saving configuration on the user equipment.

In a possible implementation manner, the user equipment may send, to the network side, a request for increasing a discontinuous reception period of the user equipment. If accepting the foregoing request, the network side increases the discontinuous reception period set for the user equipment. In this way, time of listening on a physical downlink control channel when the user equipment in the RRC connected state wakes up can be reduced, so as to achieve an objective of saving power.

In another possible implementation manner, the user equipment may send, to the network side, a request for increasing power used for sending data to the user equipment. If accepting the foregoing request, the network side increases the power used for sending data to the user equipment, which can reduce times of error receiving when the user equipment is in the RRC connected state, so as to achieve an objective of saving power.

In another possible implementation manner, the user equipment UE may send, to the network side, a request for increasing a size of a data block sent to the user equipment. If accepting the foregoing request, the network side increases the size of the data block sent to the user equipment, which can reduce times of receiving when the user equipment is in the RRC connected state, so as to achieve an objective of saving power.

In another possible implementation manner, the user equipment may send, to the network side, a request for enabling a disabled cell for the user equipment. If accepting the foregoing request, the network side enables the disabled cell, which can enable the disabled cell to improve, when a distance between the user equipment in the RRC connected state and the disabled cell is less than a distance between the user equipment and a serving base station of the user equipment, channel quality provided for the user equipment, so as to achieve an objective of saving power. For example, the network side determines, according to a current position of the user equipment, that the user equipment is relatively far away from the serving base station; however, there is a disabled cell base station near the user equipment, where a distance between the user equipment and the cell base station is less than a distance between the user equipment and the serving base station, for example, 5 m or 10 m. In this case, the cell base station may be enabled, thereby improving channel quality provided for the user equipment.

The foregoing multiple possible implementation manners indicate that the user equipment may add a power saving configuration to the power saving configuration request, where the power saving configuration is expected by the user equipment, and the network side is specifically requested to perform the power saving configuration. For example, when the user equipment is in the RRC connected state, the user equipment may send, to the network side, a request for increasing a discontinuous reception period of the user equipment; the user equipment may send, to the network side, a request for increasing power used for sending data to the user equipment; the user equipment may send, to the network side, a request for increasing a size of a data block sent to the user equipment; or the user equipment may send, to the network side, a request for enabling a disabled cell for the user equipment. For another example, when the user equipment is in the RRC idle state, the user equipment may send, to the network side, a request for changing a paging cycle of the user equipment; the user equipment may send, to the network side, a request for adding a tracking area configured for the user equipment; or the user equipment may send, to the network side, a request for improving a frequency priority that is of a cell with a large coverage area and that is configured for the user equipment. The network side may accept the foregoing power saving configuration requests, and performs the power saving configuration on the user equipment.

According to one or more possible implementation manners of the user equipment power saving method in this embodiment of the present invention, a person skilled in the art may understand that, more possible implementation manners of user equipment power saving are further included in actual application, and may be used to reduce power consumption when user equipment is in an RRC connected state or an RRC idle state, thereby improving experience on the user equipment.

Figure 2:
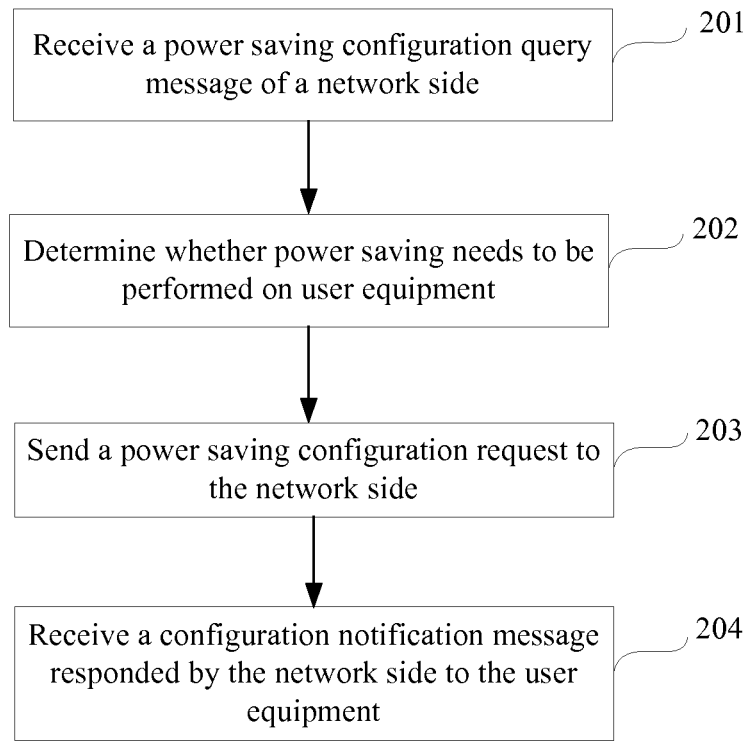
FIG. 2 is a schematic flowchart of another embodiment of a user equipment power saving method according to an embodiment of the present invention.

FIG. 2 is a schematic flowchart of another embodiment of a user equipment power saving method according to an embodiment of the present invention. An entity for executing the method may be user equipment, and the method includes the following content:

Step 201: Receive a power saving configuration query message sent by a network side, where the power saving configuration query message is used to query whether power saving needs to be performed on the user equipment.

Specifically, the network side may send the power saving configuration query message to the user equipment, where the power saving configuration query message is used to query whether power saving needs to be performed on the user equipment. The user equipment may receive the power saving configuration query message, and execute step 202 to determine whether power saving needs to be performed.

Step 202: Determine whether power saving needs to be performed on the user equipment.

Specifically, the user equipment may determine, according to a current service requirement, current power quantity, and a received instruction used for instructing power saving, whether power saving needs to be performed. If power saving needs to be performed on the user equipment, a power saving configuration request may be sent to the network side.

Step 203: When power saving needs to be performed on the user equipment, the user equipment may send a power saving configuration request to the network side, so that the network side performs a power saving configuration on the user equipment according to the power saving configuration request.

Specifically, in some cases, an owner of the user equipment expects that the user equipment lasts for relatively long standby time, for example, in a case in which the user equipment is used at night or a charging device is not carried. Therefore, the user equipment may send the power saving configuration request to the network side; or a user triggers a power saving control application program installed on the user equipment and the power saving control application runs, so that a power saving configuration request is generated, and the generated power saving configuration request is sent to the network side by carrying the request in signaling.

In step 203, the user equipment may send the power saving configuration request to the network side by using radio resource control RRC signaling, or send the power saving configuration request to the network side by using non-access stratum (NAS) signaling.

Figure 3:
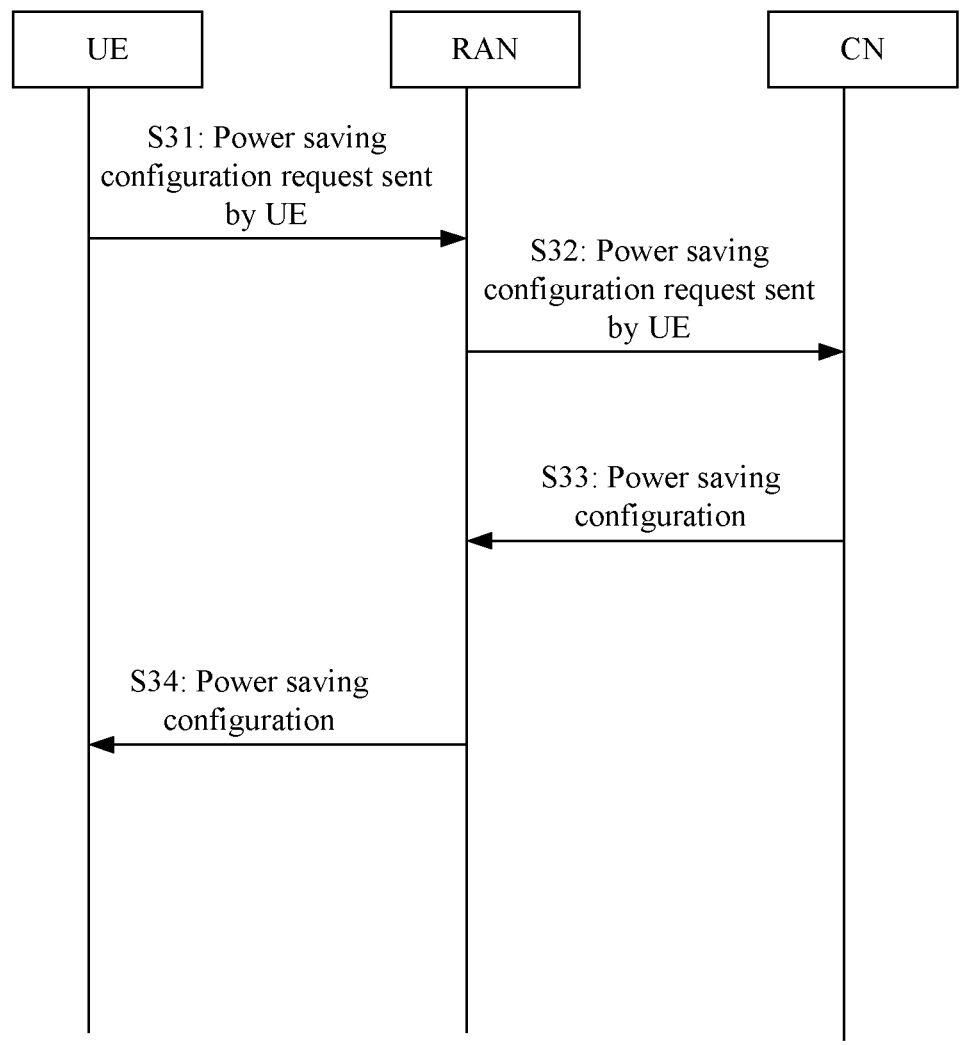
FIG. 3 is a schematic interaction diagram of an embodiment of a user equipment power saving method according to an embodiment of the present invention.

In an example, when the user equipment sends the power saving configuration request to the network side by using RRC signaling, a base station in a radio access network (RAN) needs to parse the power saving configuration request and then forwards a parsed power saving configuration request to an MME in a core network (CN), and the MME performs the power saving configuration on the user equipment. As shown in FIG. 3, S31: the user equipment sends the power saving configuration request to the access network RAN by using the RRC signaling; S32: the RAN forwards, to the core network CN, the power saving configuration request sent by the UE; S33: the core network performs a power saving configuration for the UE and sends the power saving configuration to the RAN by using the RRC signaling; S34: the RAN sends, to the UE by using the RRC signaling, the power saving configuration performed by the core network on the UE.

Figure 4:
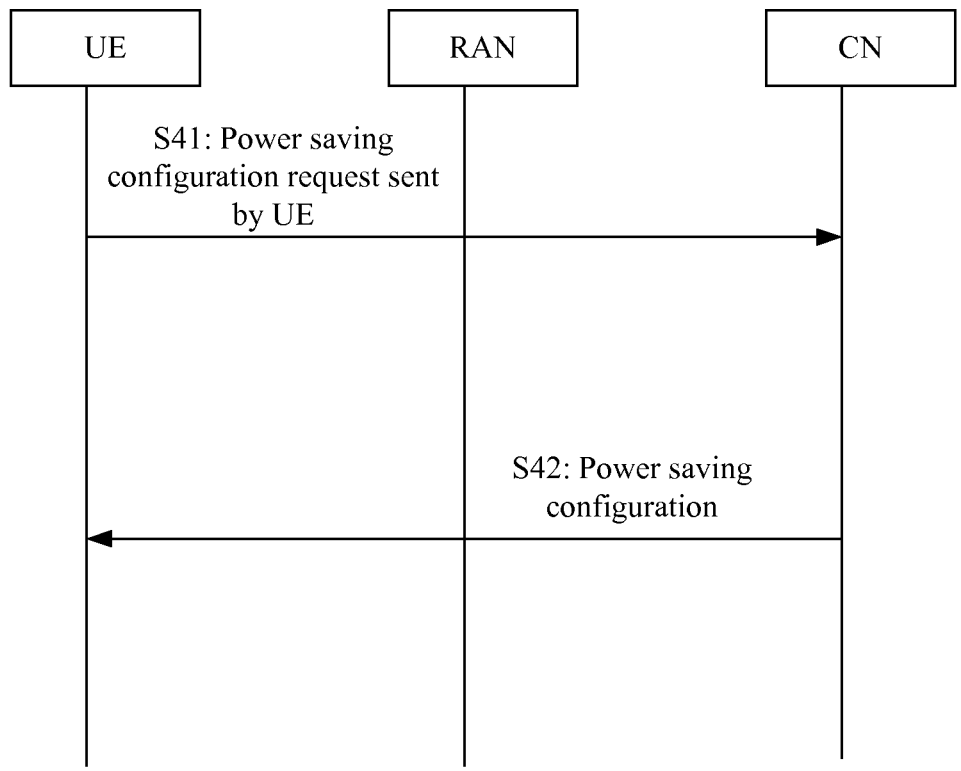
FIG. 4 is a schematic interaction diagram of another embodiment of a user equipment power saving method according to an embodiment of the present invention.

In another example, the user equipment directly sends the power saving configuration request to the MME in the core network CN by using NAS signaling, as shown in FIG. 4.

S41: The UE sends the power saving configuration request to the core network by using the NAS signaling in a RAN transparent transmission manner.

S42: The core network CN sends, to the UE by using the NAS signaling, a power saving configuration performed on the UE.

For descriptions about the power saving configuration request sent by the UE and the power saving configuration requested in the power saving configuration request in this embodiment of the present invention, reference may be specifically made to descriptions in the embodiment shown in FIG. 1, and details are not described herein again.

The network side may not send, to the user equipment, information about how to perform a power saving configuration, or a network may send, to the user equipment by using a power saving configuration message, information about how to perform a power saving configuration. If the network side sends, to the user equipment by using the power saving configuration message, the information about how to perform a power saving configuration, step 204 may further be included after step 203.

Step 204: Receive a configuration notification message responded by the network side to the user equipment.

Specifically, after receiving the power saving configuration request sent by the user equipment, the network side modifies a configuration of the user equipment, adjusts priorities of network functions, and sends a modified configuration to the user equipment; the user equipment receives the configuration notification message responded by the network side to the user equipment.

According to the foregoing embodiment, user equipment sends a power saving configuration request to a network side according to a query of the network side, and the network side modifies a configuration of the user equipment according to the request sent by the user equipment, so as to achieve an objective of reducing power consumption of the user equipment.

Still further, when power saving does not need to be performed, the user equipment may send a power saving exit request by using RRC signaling or NAS signaling; after receiving the power saving exit request, the network side terminates power saving performed on the user equipment, and restores a normal configuration (for example, terminates an accounting service).

Figure 5:
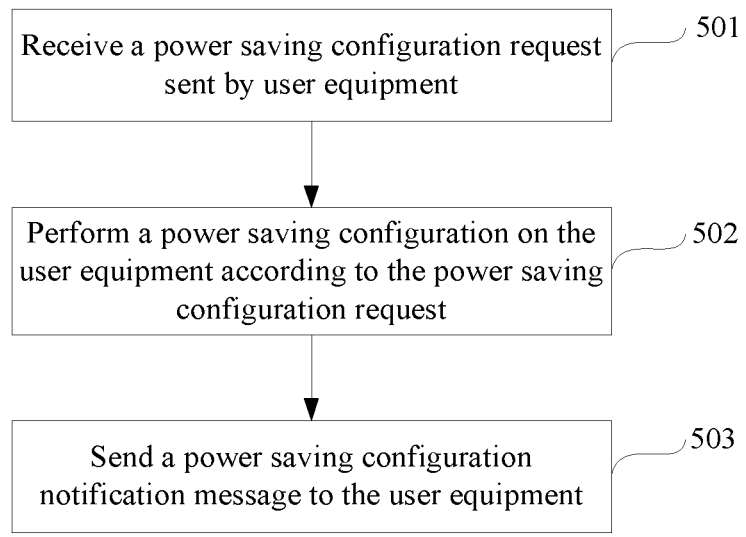
FIG. 5 is a schematic flowchart of another embodiment of a user equipment power saving method according to an embodiment of the present invention.

FIG. 5 is a schematic flowchart of a user equipment power saving method according to an embodiment of the present invention. An entity for executing this embodiment is a network side, where the network side may be a device (for example, a base station) on a RAN side, or may be a core network device (for example, a mobility management entity). It can be learned from FIG. 5 that the method includes the following content:

Step 501: Receive a power saving configuration request sent by user equipment, where the power saving configuration request is used to request the network side to perform, according to the power saving configuration request, a power saving configuration on the user equipment.

Specifically, the network side may receive the power saving configuration request sent by the user equipment by using RRC signaling or NAS signaling. Sending the power saving configuration request by the user equipment by using the RRC signaling is implemented by means of forwarding the request by using an access network RAN; however, sending the power saving configuration request by the user equipment by using the NAS signaling is implemented by means of sending the request to the core network by the user equipment in a RAN transparent transmission manner.

Step 502: Perform the power saving configuration on the user equipment according to the power saving configuration request.

Specifically, after receiving the power saving configuration request sent by the user equipment, the network side may perform the power saving configuration on the user equipment.

If the network side needs to perform the power saving configuration request when the user equipment is in an RRC idle state, the performing the power saving configuration on the user equipment specifically includes one or more of the following manners:

changing a paging cycle of the user equipment, so as to reduce times of paging listening performed when the user equipment wakes up at a fixed time;

adding a tracking area (TA) configured for the user equipment, so as to simplify a process of tracking area TA updating that needs to be performed by the user equipment during inter-tracking area movement; and improving a frequency priority that is of a cell with a large coverage area and that is configured for the user equipment, so as to reduce times of reselection performed by the user equipment during inter-cell movement. For example, coverage areas, in which the user equipment can move, of multiple cells may be determined according to a sending frequency band of the network side. For a cell with a relatively large coverage area, a frequency priority of the cell is improved; correspondingly, for a cell with a relatively small coverage area, a frequency priority of the cell may be reduced.

For the foregoing manners, one manner may be selected, or several manners are combined for use, and details are not described again.

If the network side performs the power saving configuration when the user equipment is in an RRC connected state, the performing the power saving configuration on the user equipment according to the power saving configuration request specifically includes one or more of the following manners:

increasing a discontinuous reception period of the user equipment, so as to reduce time of listening, when the user equipment wakes up, on a physical downlink control channel PDCCH;

increasing power used for sending data to the user equipment, so as to reduce times of error receiving by the user equipment;

increasing a size of a data block sent to the user equipment, so as to reduce times of receiving by the user equipment; and enabling a disabled cell for the user equipment, so that when a distance between the user equipment and the disabled cell is less than a distance between the user equipment and a serving base station of the user equipment, the disabled cell improves channel quality provided for the user equipment, and data is sent to the user equipment by using a larger data block, so as to achieve an effect of saving power.

In actual application, one of the foregoing manners may be used or several manners may be combined, to perform a power saving configuration, and details are not described again.

In actual application, the network side may pre-configure a power saving configuration for the user equipment in either of the two states, and a type of a power saving configuration is selected as required. For example, a power saving configuration in the RRC connected state may be configured for the user equipment in the RRC connected state. When the user equipment switches from the RRC connected state to the RRC idle state, the network side may perform a network operation according to a pre-configured power saving configuration in the idle state; after the user equipment switches from the RRC idle state to the RRC connected state, the network side may perform a network operation according to a pre-configured power saving configuration in the RRC connected state.

In this embodiment of the present invention, the network side may choose to notify the user equipment of the power saving configuration, or choose not to notify the user equipment of the power saving configuration. If the network side notifies the user equipment of the power saving configuration performed on the user equipment, step 503 may further be executed.

Step 503: Send a power saving configuration notification message to the user equipment, where the power saving configuration notification message is used to notify the user equipment of the power saving configuration performed by the network side on the user equipment.

In step 503, after modifying a configuration of the user equipment, the network side sends a modified configuration to the user equipment by using the power saving configuration notification message.

As power saving configurations for the user equipment in different states are different, power saving configuration notification messages sent by the network side may be different.

According to the foregoing embodiment, a network side can modify a configuration of user equipment according to a power saving configuration request actively sent by the user equipment, so as to achieve an objective of reducing power consumption of the user equipment.

Certainly, if receiving a power saving exit request sent by the user equipment, the network side restores the configuration of the user equipment to a normal condition, which is used as an exit mechanism.

Figure 6:
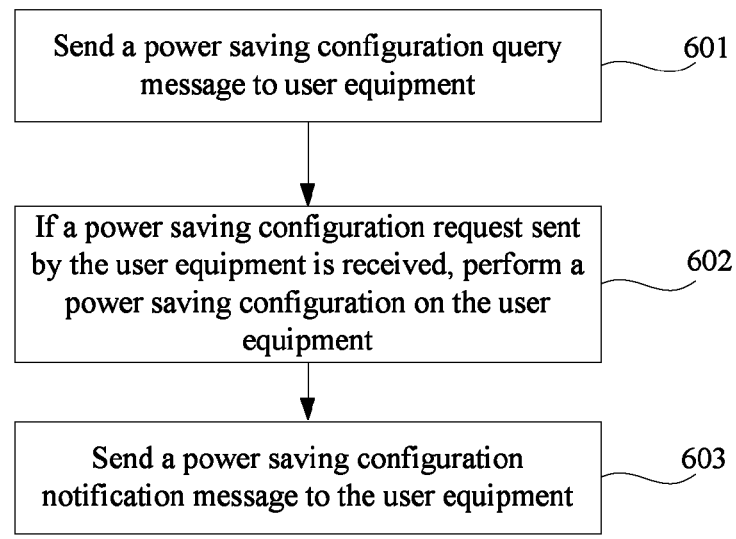
FIG. 6 is a schematic flowchart of another embodiment of a user equipment power saving method according to an embodiment of the present invention.

Another embodiment of a user equipment power saving method according to an embodiment of the present invention is introduced in the following from a perspective of a network side. FIG. 6 is a schematic flowchart of the method, and it can be learned from the figure that the method includes the following content:

Step 601: Send a power saving configuration query message to user equipment, where the power saving configuration query message is used to query whether power saving needs to be performed on the user equipment.

Specifically, the network side may provide a power saving configuration service. When providing the service, the network side may charge a user a specific fee, or does not charge any fee. The network side may send the power saving configuration query message to the user equipment in an RRC idle state or an RRC connected state.

Step 602: If a power saving configuration request sent by the user equipment is received, perform a power saving configuration on the user equipment. Optionally, if power saving configuration refusal information of the user equipment is received, do not perform a power saving configuration on the user equipment; or when that a power saving configuration request sent by the user equipment is not received within a timeout period, do not perform a power saving configuration on the user equipment.

For power saving configuration performed by the network side on the user equipment in this embodiment of the present invention, reference may be specifically made to descriptions in any of the embodiments shown in FIG. 1 to FIG. 4, and details are not described herein again.

Optionally, the network side performs the power saving configuration on the user equipment, and may send, to the user equipment, information about how to perform a power saving configuration.

Step 603: Send a power saving configuration notification message to the user equipment, where the power saving configuration notification message is used to notify the user equipment of a power saving configuration performed by the network side on the user equipment.

According to this embodiment, a network side may actively query whether a power saving configuration needs to be performed on user equipment; if the user equipment needs this service, the network side modifies a configuration of the user equipment according to a request sent by the user equipment, so as to achieve an objective of reducing power consumption of the user equipment, thereby improving user experience.

Figure 7:
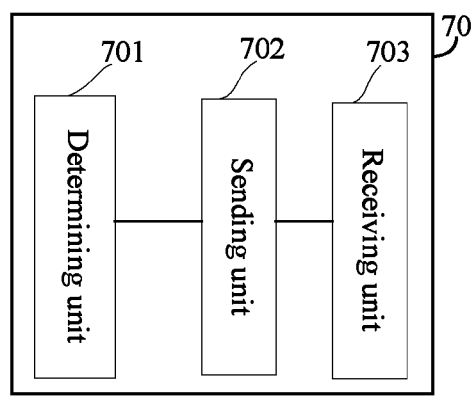
FIG. 7 is a schematic structural diagram of user equipment according to an embodiment of the present invention.

As shown in FIG. 7, an embodiment of the present invention provides user equipment 70, including:

a determining unit 701, configured to determine whether power saving needs to be performed on the user equipment 70; and a sending unit 702, configured to: when power saving needs to be performed on the user equipment, send a power saving configuration request to a network side, where the power saving configuration request is used by the network side to perform a power saving configuration on the user equipment according to the power saving configuration request.

In an example, the determining unit 701 may determine, according to a current service requirement, a current power quantity, or a received instruction of the user equipment, whether power saving needs to be performed, where the instruction is used for instructing power saving.

In an example, the sending unit 702 may be specifically configured to: request the network side to change a paging cycle of the user equipment, request the network side to add a tracking area configured for the user equipment, request the network side to improve a frequency priority that is of a cell with a large coverage area and that is configured for the user equipment, request the network side to increase a discontinuous reception period of the user equipment, request the network side to increase power used for sending data to the user equipment, request the network side to increase a size of a data block sent to the user equipment, or request the network side to enable a disabled cell for the user equipment.

Optionally, the user equipment may further include: a receiving unit 703, configured to receive a configuration notification message responded by the network side to the user equipment.

The embodiment shown in FIG. 7 is corresponding to the method embodiment shown in FIG. 1 or FIG. 2, and the user equipment provided in the embodiment shown in FIG. 7 may execute the actions and the steps in the method embodiment shown in FIG. 1 or FIG. 2. For details, reference may be made to the method embodiment, and details are not described herein again.

By using the user equipment provided in this embodiment of the present invention, a network side may perform a power saving configuration on the user equipment when power saving needs to be performed on the user equipment, thereby reducing power consumption of the user equipment and improving user experience.

Figure 8:
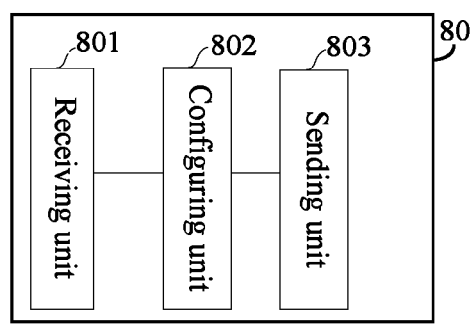
FIG. 8 is a schematic structural diagram of a power saving configuration apparatus according to an embodiment of the present invention.

An embodiment of the present invention further provides a power saving configuration apparatus 80, where the power saving configuration apparatus 80 may be an access network device (for example, a base station) or a core network device. As shown in FIG. 8, the power saving configuration apparatus 80 includes:

a receiving unit 801, configured to receive a power saving configuration request sent by user equipment, and send the received power saving configuration request to a configuring unit 802, where the power saving configuration request is used to request the power saving configuration apparatus to perform, according to the power saving configuration request, a power saving configuration on the user equipment; and the configuring unit 802, configured to receive the power saving configuration request sent by the receiving unit 801, perform the power saving configuration on the user equipment according to the power saving configuration request, and send the power saving configuration to a sending unit 803.

Optionally, the power saving configuration apparatus may further include:

the sending unit 803, configured to send a power saving configuration notification message to the user equipment, where the power saving configuration notification message is used to notify the user equipment of the power saving configuration performed by the power saving configuration apparatus on the user equipment.

In addition, the power saving configuration apparatus may further include: a querying unit, configured to send a power saving configuration query message to the user equipment, where the power saving configuration query message is used to query whether power saving needs to be performed on the user equipment. Correspondingly, the configuring unit 802 may be specifically configured to perform the power saving configuration on the user equipment when the receiving unit 801 receives the power saving configuration request sent by the user equipment. When receiving the power saving configuration request sent by the user equipment, the receiving unit 801 may use the power saving configuration request as a response to the foregoing power saving configuration query message. If that the receiving unit 801 does not receive a power saving configuration request sent by the user equipment within a timeout period, or the receiving unit 801 receives power saving configuration refusal information sent by the user equipment, the configuring unit 802 does not need to perform the power saving configuration on the user equipment, and an existing configuration remains unchanged.

In an example, if the user equipment is in an RRC idle state, that the configuring unit 802 performs the power saving configuration on the user equipment specifically includes one or more of the following manners:

changing a paging cycle of the user equipment;

adding a tracking area configured for the user equipment; and improving a frequency priority that is of a cell with a large coverage area and that is configured for the user equipment.

In another example, if the user equipment is in an RRC connected state, that the configuring unit 802 performs the power saving configuration on the user equipment specifically includes one or more of the following manners:

increasing a discontinuous reception period of the user equipment;

increasing power used for sending data to the user equipment;

increasing a size of a data block sent to the user equipment; and enabling a disabled cell for the user equipment.

It should be noted that, the power saving configuration apparatus shown in FIG. 8 may be configured to implement any of the method embodiments shown in FIG. 1 to FIG. 6. A specific power saving configuration request made for the user equipment is similar to that of the foregoing embodiments, and details are not described herein again.

By applying the power saving configuration apparatus provided in this embodiment of the present invention, power saving configuration may be performed on user equipment when power saving needs to be performed on the user equipment, thereby reducing power consumption of the user equipment and improving experience on the user equipment.

Figure 9:
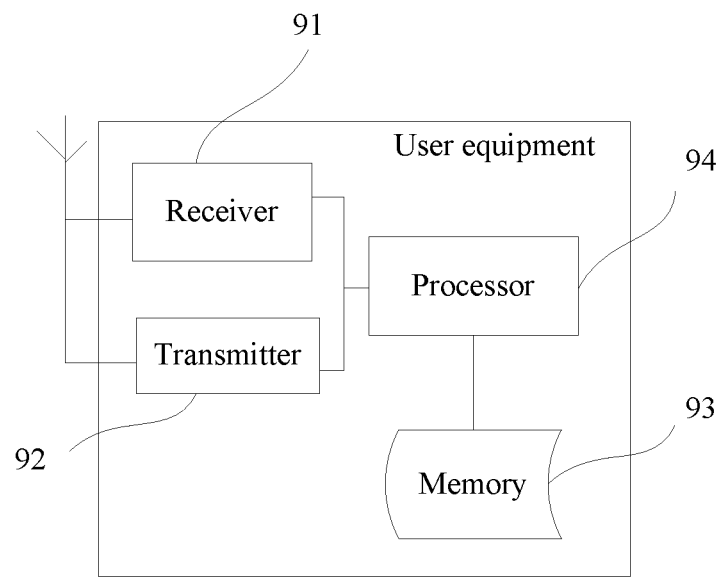
FIG. 9 is a schematic structural diagram of user equipment according to an embodiment of the present invention.

FIG. 9 is a schematic structural diagram of user equipment according to an embodiment of the present invention. As shown in the figure, the user equipment includes a transmitter 92, a receiver 91, a memory 93, and a processor 94 separately connected to the transmitter 92, the receiver 91 and the memory 93. Certainly, the user equipment may further include general components, such as an antenna, a baseband processing component, an intermediate radio frequency processing component, and an input and output apparatus, which is not construed as a limitation on this embodiment of the present invention herein.

The memory 93 stores a set of program code, and the processor 94 is configured to invoke the program code stored in the memory 93, so as to execute the following operations:

determining whether power saving needs to be performed on the user equipment; and sending a power saving configuration request to a network side by using the transmitter 92, so that the network side performs a power saving configuration on the user equipment according to the power saving configuration request.

It should be noted that, the user equipment shown in FIG. 9 may be configured to implement any method provided in the foregoing method embodiments. A specific power saving configuration request sent to the network side is similar to that of the foregoing embodiments, and details are not described herein again.

By using the user equipment provided in this embodiment of the present invention, a network side may perform a power saving configuration on the user equipment when power saving needs to be performed on the user equipment, thereby reducing power consumption of the user equipment and improving user experience.

Figure 10:
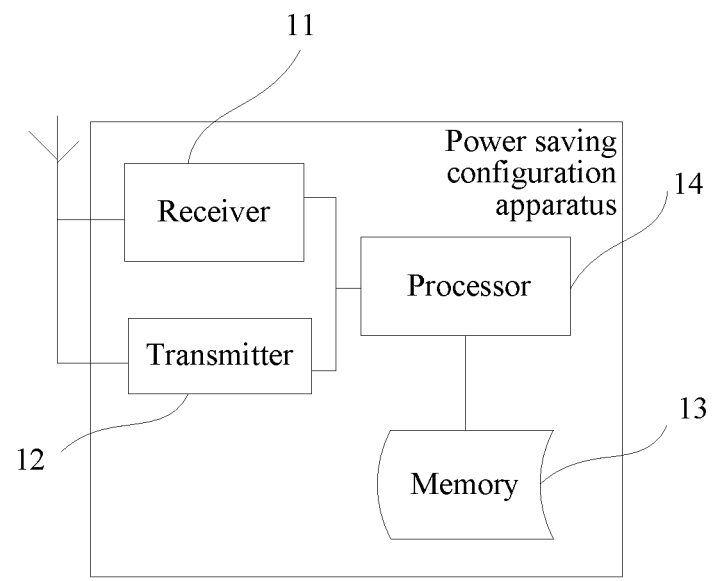
FIG. 10 is a schematic structural diagram of a power saving configuration apparatus according to an embodiment of the present invention.

FIG. 10 is a schematic structural diagram of a power saving configuration apparatus according to an embodiment of the present invention. As shown in the figure, the power saving configuration apparatus includes a transmitter 12, a receiver 11, a memory 13, and a processor 14 separately connected to the transmitter 12, the receiver 11 and the memory 13. Certainly, the power saving configuration apparatus may further include general components, such as an antenna, a baseband processing component, an intermediate radio frequency processing component, and an input and output apparatus, which is not construed as a limitation on this embodiment of the present invention herein.

The memory 13 stores a set of program code, and the processor 14 is configured to invoke the program code stored in the memory 13, so as to execute the following operations:

receiving, by using the receiver 11, a power saving configuration request sent by user equipment, where the power saving configuration request is used to request a network side to perform, according to the power saving configuration request, a power saving configuration on the user equipment; and performing the power saving configuration on the user equipment according to the power saving configuration request.

It should be noted that, the power saving configuration apparatus shown in FIG. 10 may be configured to implement any method provided in the foregoing method embodiments. A specific power saving configuration request made for the user equipment is similar to that of the foregoing embodiments, and details are not described herein again.

By applying the power saving configuration apparatus provided in this embodiment of the present invention, power saving configuration may be performed on user equipment when power saving needs to be performed on the user equipment, thereby reducing power consumption of the user equipment and improving experience on the user equipment.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and beneficial effects of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A user equipment power saving method, comprising:
   determining, by a user equipment operating in a communication system, whether power saving needs to be performed on the user equipment;
   upon determining that power saving needs to be performed on the user equipment, sending, by the user equipment, a power saving configuration request to a network side of the communication system requesting the network side to perform a power saving configuration on the user equipment, such that the network side, in response to the request, performs the power saving configuration on the user equipment by modifying a configuration of the user equipment according to the power saving configuration request, wherein the power saving configuration includes:
     adding a tracking area configured for the user equipment; or
     improving a frequency priority that is of a cell with a large coverage area and that is configured for the user equipment; or
     increasing power used for sending data to the user equipment; or
     increasing a size of a data block sent to the user equipment; or
     enabling a disabled cell for the user equipment; and
   upon subsequently determining that the power saving configuration is no longer needed, sending, by the user equipment, a power saving exit request to the network side, such that the network side terminates the power saving configuration performed on the user equipment and restores the configuration of the user equipment to a state of the configuration prior to the modifying of the configuration.

2. The user equipment power saving method according to claim 1, after the sending a power saving configuration request to a network side, further comprising:
   receiving a power saving configuration notification message responded by the network side to the user equipment, wherein the power saving configuration notification message is used to notify the user equipment of the power saving configuration performed by the network side on the user equipment.

3. The user equipment power saving method according to claim 1, wherein the sending a power saving configuration request to a network side includes:
   requesting, by the user equipment, the network side to perform the power saving configuration on the user equipment in a radio resource control idle RRC idle state.

4. The user equipment power saving method according to claim 1, before the sending a power saving configuration request to a network side, further comprising:
   receiving a power saving control application instruction, wherein the power saving control application instruction is used to generate the power saving configuration request.

5. The user equipment power saving method according to claim 1, before the determining whether power saving needs to be performed on user equipment, further comprising:
   receiving a power saving configuration query message sent by the network side, wherein the power saving configuration query message queries whether power saving needs to be performed on the user equipment.

6. The user equipment power saving method according to claim 1, wherein the sending a power saving configuration request to a network side includes:
   requesting, by the user equipment, the network side to perform the power saving configuration on the user equipment in a radio resource control connected RRC connected state.

7. A user equipment, comprising:
a transmitter;
a receiver;
a memory; and
a processor separately connected to the transmitter, the receiver and the memory, wherein
the memory stores a set of program code, and the processor is configured to invoke the program code stored in the memory, so as to execute the following operations when the user equipment is operating in a communication system that includes a network side:
determining whether power saving needs to be performed on the user equipment;
upon determining that power saving needs to be performed on the user equipment, sending, by using the transmitter, a power saving configuration request to the network side requesting the network side to perform a power saving configuration on the user equipment, such that the network side, in response to the request, performs the power saving configuration on the user equipment by modifying a configuration of the user equipment according to the power saving configuration request, wherein the power saving configuration includes:
adding a tracking area configured for the user equipment; or
improving a frequency priority that is of a cell with a large coverage area and that is configured for the user equipment; or
increasing power used for sending data to the user equipment; or
increasing a size of a data block sent to the user equipment; or
enabling a disabled cell for the user equipment; and
upon subsequently determining that the power saving configuration is no longer needed, sending, by the user equipment, a power saving exit request to the network side, such that the network side terminates the power saving configuration performed on the user equipment and restores the configuration of the user equipment to a state of the configuration prior to the modifying of the configuration.

8. The user equipment according to claim 7, wherein the receiver is configured to receive a power saving configuration notification message responded by the network side to the user equipment, wherein the power saving configuration notification message is used to notify the user equipment of the power saving configuration performed by the network side on the user equipment.

9. The user equipment according to claim 7, the receiver is configured to request the network side to perform the power saving configuration on the user equipment in a radio resource control idle RRC idle state.

10. The user equipment according to claim 7, wherein the receiver is further configured to receive a power saving control application instruction, wherein the power saving control application instruction is used to generate the power saving configuration request.

11. The user equipment according to claim 7, the receiver is configured to request the network side to perform the power saving configuration on the user equipment in radio resource control connected RRC connected state.

12. A power saving configuration apparatus, comprising:
a transmitter;
a receiver;
a memory; and a processor separately connected to the transmitter, the receiver and the memory, wherein
the memory stores a set of program code, and the processor is configured to invoke the program code stored in the memory, so as to execute the following operations:
receiving a power saving configuration request sent by user equipment, wherein the power saving configuration request is used to request the power saving configuration apparatus to perform, according to the power saving configuration request, a power saving configuration on the user equipment;
performing the power saving configuration on the user equipment according to the power saving configuration request by modifying a configuration of the user equipment according to the power saving configuration request, wherein the power saving configuration includes:
adding a tracking area configured for the user equipment; or
improving a frequency priority that is of a cell with a large coverage area and that is configured for the user equipment; or
increasing power used for sending data to the user equipment; or
increasing a size of a data block sent to the user equipment; or
enabling a disabled cell for the user equipment;
receiving, from the user equipment, a power saving exit request; and
in response to receiving the power saving exit request, terminating the power saving configuration and restoring the configuration of the user equipment to a state prior to the performing the power saving configuration.

13. The power saving configuration apparatus according to claim 12, wherein the transmitter is configured to send a power saving configuration query message to the user equipment, wherein the power saving configuration query message queries whether power saving needs to be performed on the user equipment; and
if the power saving configuration request is received, the processor is configured to determine that power saving needs to be performed on the user equipment.

14. The power saving configuration apparatus according to claim 12, wherein the transmitter is configured to send a power saving configuration notification message to the user equipment, wherein the power saving configuration notification message is used to notify the user equipment of the power saving configuration performed by the power saving configuration apparatus on the user equipment.

15. The power saving configuration apparatus according to claim 12, wherein the processor is configured to perform at least one of the following:
changing a paging cycle of the user equipment; or
adding a tracking area configured for the user equipment; or
improving a frequency priority that is of a cell with a large coverage area and that is configured for the user equipment; wherein
the user equipment is in a radio resource control idle RRC idle state.

16. The power saving configuration apparatus according to claim 12, wherein the processor is configured to perform at least one of the following:
increasing a discontinuous reception period of the user equipment; or increasing power used for sending data to the user equipment; or increasing a size of a data block sent to the user equipment; or enabling a disabled cell for the user equipment; wherein the user equipment is in a radio resource control connected RRC connected state.

\* \* \* \* \*